(12) United States Patent
Dondurur et al.

(10) Patent No.: US 9,481,388 B2
(45) Date of Patent: Nov. 1, 2016

(54) LUGGAGE SLIDERS

(71) Applicant: KING FAHD UNIVERSITY OF PETROLEUM AND MINERALS, Dhahran (SA)

(72) Inventors: Mehmet Dondurur, Crofton, MD (US); Ahmet Z. Sahin, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 14/973,354

(22) Filed: Dec. 17, 2015

(65) Prior Publication Data

US 2016/0101796 A1 Apr. 14, 2016

Related U.S. Application Data

(62) Division of application No. 13/927,907, filed on Jun. 26, 2013, now abandoned.

(51) Int. Cl.
*B62B 5/02* (2006.01)
*A45C 5/14* (2006.01)

(52) U.S. Cl.
CPC .......... *B62B 5/025* (2013.01); *A45C 5/14* (2013.01); *A45C 5/143* (2013.01); *A45C 5/146* (2013.01); *A45C 2005/147* (2013.01)

(58) Field of Classification Search
CPC ........ B62B 5/025; A45C 5/14; A45C 5/143; A45C 5/146; A45C 2005/147
See application file for complete search history.

(56) References Cited

U.S. PATENT DOCUMENTS

| 3,841,650 | A | * | 10/1974 | Miskelly | A45C 13/385 |
| | | | | | 280/37 |
| 4,163,564 | A | * | 8/1979 | Kramer | B62B 5/025 |
| | | | | | 280/10 |
| 4,570,954 | A | | 2/1986 | Mintz | |
| 4,589,668 | A | * | 5/1986 | Mares | B62B 13/18 |
| | | | | | 280/10 |
| 4,618,157 | A | * | 10/1986 | Resnick | B62B 13/18 |
| | | | | | 280/43.1 |
| 4,778,190 | A | * | 10/1988 | Meredith | B62B 13/18 |
| | | | | | 280/13 |
| 5,044,476 | A | | 9/1991 | Seynhaeve | |

(Continued)

FOREIGN PATENT DOCUMENTS

CN 101756459 6/2010

OTHER PUBLICATIONS

Any identified foreign patents and/or publications were properly filed in parent U.S. Appl. No. 13/927,907, filed Jun. 26, 2015, the priority of which is claimed.

*Primary Examiner* — Tri Mai
(74) *Attorney, Agent, or Firm* — Richard C. Litman

(57) ABSTRACT

The luggage sliders include various embodiments for permanent or removable installation upon the underside of a roll-around suitcase, wheeled cart, or similar article to facilitate movement of the article up a flight of stairs or other stepped inclined surface. Some of the sliders are pivotally extendible and retractable. Others are telescopically extendible and retractable. Still others are pivotally attached to one edge of the article, and pivotally fold against a surface of the article for storage. Still others may be adjustably clamped about the base of the article. Still others are pivotally attached about a wheel axle to rotate and lie beneath the wheel for operation. Still others may be removably attached directly to the wheels of the luggage, cart, or other wheeled article. Still others are pivotally attached to a point on the luggage and telescopically extend to project below the wheel for use.

2 Claims, 8 Drawing Sheets

(56) References Cited

U.S. PATENT DOCUMENTS

| | | | |
|---|---|---|---|
| 5,253,739 A | 10/1993 | King | |
| 5,269,544 A | 12/1993 | Park | |
| 5,413,361 A * | 5/1995 | Mosher | B62B 19/02 |
| | | | 280/13 |
| 5,515,954 A | 5/1996 | Nordstrom | |
| 5,620,191 A * | 4/1997 | Sayette | B62B 13/18 |
| | | | 280/13 |
| 5,911,422 A * | 6/1999 | Carpenter | B62B 3/007 |
| | | | 280/10 |
| D438,011 S | 2/2001 | Shick | |
| 6,443,274 B1 | 9/2002 | Klamm | |
| 6,474,097 B2 * | 11/2002 | Treppedi | A45C 11/20 |
| | | | 280/30 |
| 6,981,705 B1 * | 1/2006 | Jolley | B62B 13/06 |
| | | | 280/13 |
| 8,950,758 B2 * | 2/2015 | Bysiewicz | B62B 13/18 |
| | | | 280/13 |
| 2002/0125665 A1 | 9/2002 | Cohen | |
| 2006/0213735 A1 | 9/2006 | Weinstein et al. | |
| 2008/0230339 A1 | 9/2008 | Pereira | |
| 2010/0126815 A1 | 5/2010 | Tauro | |

* cited by examiner

LUGGAGE SLIDERS

CROSS-REFERENCE TO RELATED APPLICATIONS

This application is a divisional application of U.S. patent application Ser. No. 13/927,907, filed on Jun. 26, 2013, presently pending.

BACKGROUND OF THE INVENTION

1. Field of the Invention

The present invention relates generally to devices for moving objects, and particularly to luggage sliders that may be removably or permanently installed upon luggage or the like to facilitate movement of the luggage up a flight of stairs or other stepped incline.

2. Description of the Related Art

Suitcases, trunks, and similar luggage and baggage have been known for quite some time. Most such luggage is sized for reasonably convenient carriage by hand, but in many instances the task of carrying such luggage by hand can be tiring over an extended period of time. Accordingly, wheels were attached to such articles of luggage to facilitate their transport. The user of the luggage need only pull the luggage behind them as it rolls on its wheels.

By their nature, the wheels of such wheeled luggage protrude below the luggage, at least to some degree, in order to preclude dragging some fixed part of the luggage across the underlying surface. This generally works acceptably well on reasonably level surfaces, but the protruding wheels are an impedance when such luggage is dragged up or over a stepped inclined surface, as in transporting the luggage up a flight of stairs. Attempting to drag such wheeled luggage up a stepped incline, such as a flight of stairs, generally results in the protruding wheels catching upon the nose of each stair tread and greatly interferes with the transport of the luggage. Unless some other means is provided to facilitate the transport of the luggage up the stairs, the person transporting the luggage must resort to lifting the luggage and carrying it up the stairs.

Thus, luggage sliders solving the aforementioned problems are desired.

SUMMARY OF THE INVENTION

The luggage sliders include a number of different embodiments, each adapted to facilitate the movement of an article of luggage, particularly wheeled luggage, up a stepped incline, such as a flight of stairs or the like. Some of the sliders are pivotally extendible and retractable. Others are telescopically extendible and retractable. Still others are pivotally attached to one edge of the article, and pivotally fold against a surface of the article for storage. Still others may be adjustably clamped about the base of the article. Still others are pivotally attached about a wheel axle to rotate and lie beneath the wheel for operation. Still others may be removably attached directly to the wheels of the luggage, cart, or other wheeled article. Still others are pivotally attached to a point on the luggage, and telescopically extend to project below the wheel for use. Some embodiments are formed of one or more flat, rigid sheets or planks of material, while other embodiments are formed of rigid rods of metal or other suitable material. All embodiments are preferably formed with a lower surface (i.e., the surface that comes into contact with the underlying surface over which the luggage is moved) having a relatively low coefficient of friction. Those embodiments that articulate or otherwise movably deploy may be actuated by a pedal or the like disposed upon the luggage.

These and other features of the present invention will become readily apparent upon further review of the following specification and drawings.

BRIEF DESCRIPTION OF THE DRAWINGS

FIG. 11 is bottom plan view of an eleventh embodiment of a luggage slider according to the present invention, wherein two mutually opposed sliders comprising rigid U-shaped bars are retractably extendible from the bottom of a cart or the like.

FIG. 13 is a perspective view of a thirteenth embodiment of a luggage slider according to the present invention, wherein a slider is removably securable to each wheel of a wheeled suitcase or the like.

Similar reference characters denote corresponding features consistently throughout the attached drawings.

DETAILED DESCRIPTION OF THE PREFERRED EMBODIMENTS

The luggage sliders include a number of different embodiments, all facilitating the movement of an article of wheeled luggage or the like up a flight of stairs or other stepped incline. Each embodiment includes at least one slider surface disposed beneath the wheels, with the lower peripheries of the wheels protruding only slightly below the underside of the slider. In this manner, the luggage is supported by the slider as it is pulled up the incline, with the interference of the wheels as they contact the noses or edges of the treads being minimized by their very slight protrusion below the lower surface of the slider.

Figure 1:
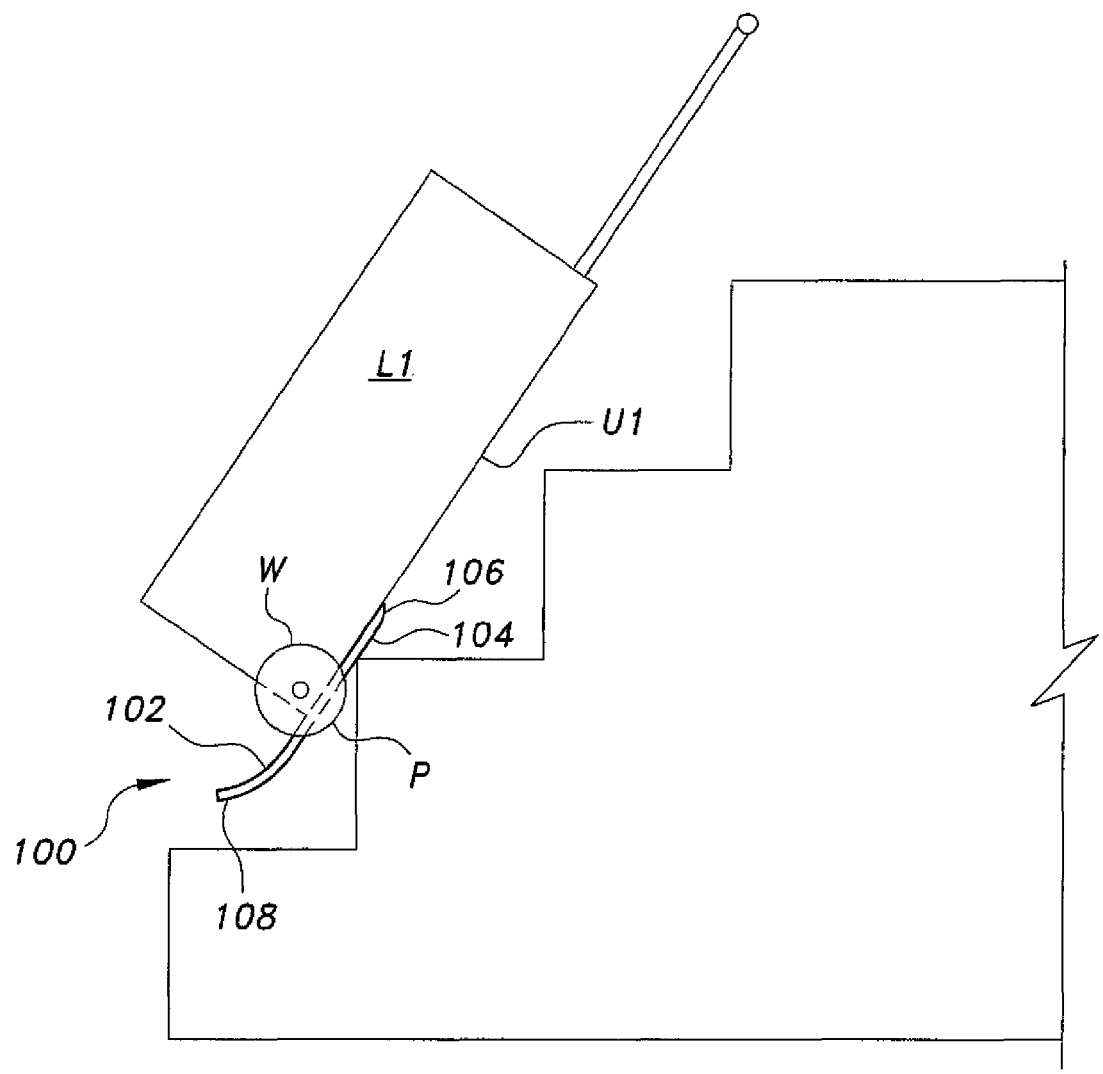
FIG. 1 is a diagrammatic environmental right side elevation view of a first embodiment of a luggage slider according to the present invention adapted for a two-wheeled roll-around suitcase or the like, illustrating its configuration and function.

FIG. 1 of the drawings provides a right side elevation view of a first embodiment 100 of the luggage slider, wherein the slider comprises a flat skid or plate 102 affixed to the underside U1 of an article of wheeled luggage L1 adjacent to the two wheels W. While only a single wheel W is illustrated in the right side view of FIG. 1, it will be understood that an identical left wheel is provided directly behind the illustrated right wheel in FIG. 1. The peripheries P of the two wheels W extend below the underside U1 of the luggage L1, with the lower surface 104 of the slider or skid 102 disposed between the underside U1 of the luggage L1 and the lowermost peripheries P of the two wheels W. The peripheries P of the wheels W extend only slightly beyond or below the lower surface 104 of the slider or skid 102, such that the discontinuity presented by the protrusion of the wheel peripheries P below the lower surface 104 of the slider 102 is minimized. The lower surface 104 of the slider or skid 102 preferably has a low coefficient of friction, e.g., a smooth polished metal or plastic surface etc. The forward end 106 of the skid 102 is faired to avoid catching upon the noses of the stair treads, while the opposite rearward end 108 of the slider or skid 102 is curved upwardly to smooth the transition over each step.

Figure 2:
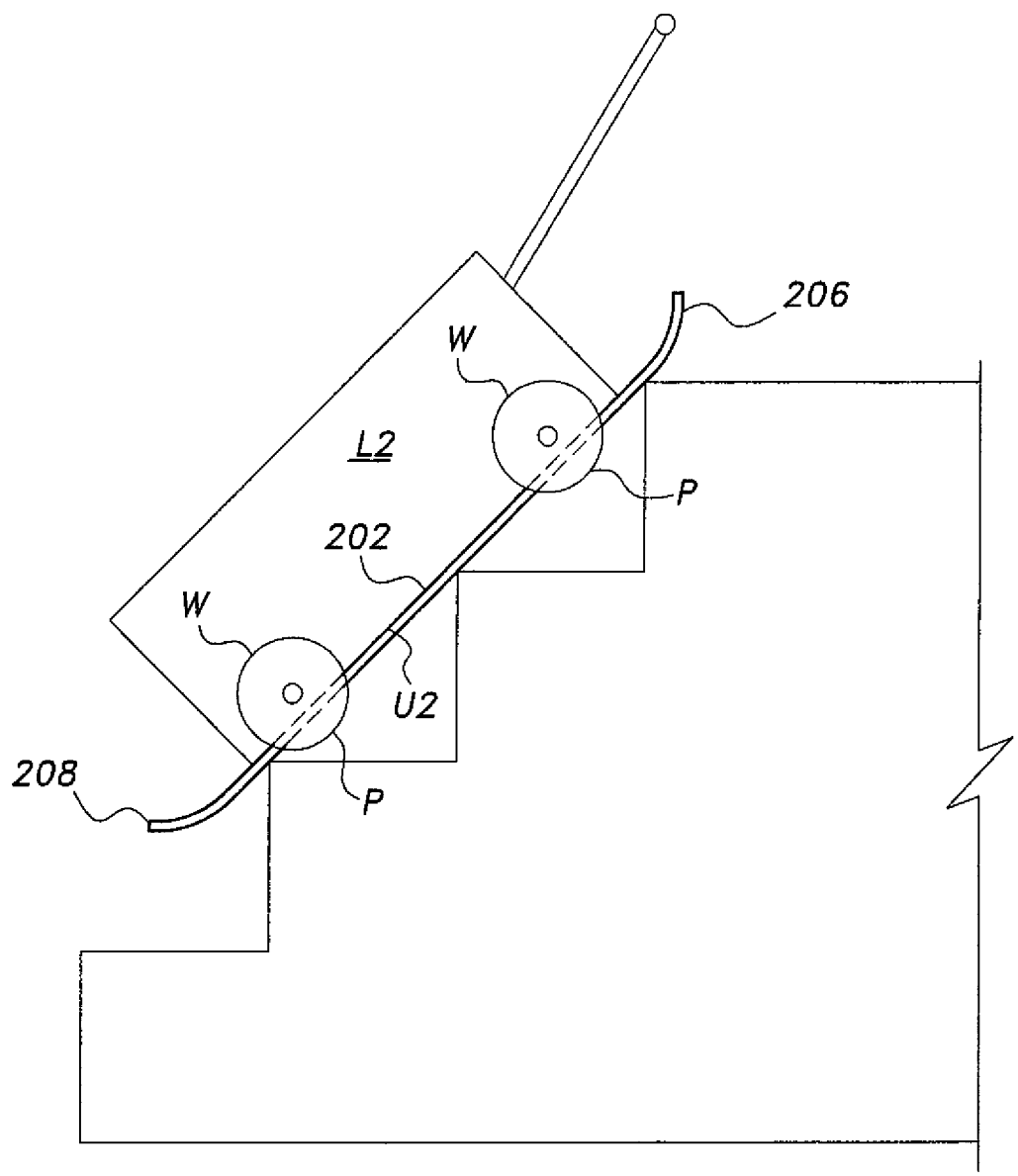
FIG. 2 is a diagrammatic environmental right side elevation view of a second embodiment of a luggage slider according to the present invention, adapted for a four-wheeled cart or the like, illustrating its configuration and function.

FIG. 2 provides a right side elevation view of a second embodiment 200 of the luggage sliders in combination with an article of luggage L2. In the embodiment 200 of FIG. 2, luggage L2 comprises a wheeled cart having forward and rearward pairs of wheels W, with the peripheries P of the wheels W extending slightly below the underside U2 of the cart. The luggage or cart L2 is provided with a luggage slider or skid 202 comprising a flat plate having a smooth lower surface 204 with a low coefficient of friction, as in the case of the luggage slider embodiment 100 of FIG. 1. The luggage skid 202 has a forward end 206 that extends beyond the forward end of the luggage or cart L2, with an opposite rearward end 208 that extends beyond the rearward end of the luggage or cart L2. Each of the ends 206 and 208 is curved upwardly to smooth the transition over each step.

Figure 3:
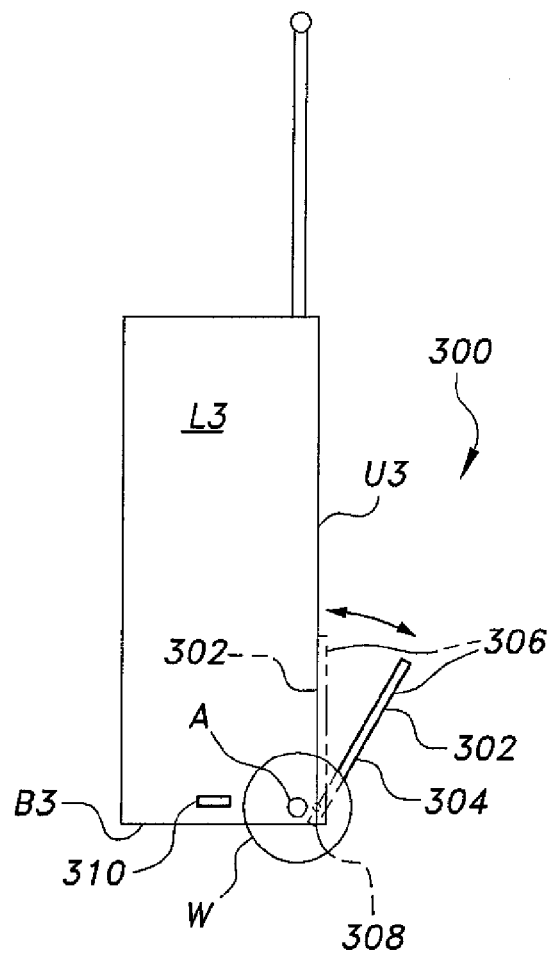
FIG. 3 is a diagrammatic right side elevation view of a third embodiment of a luggage slider according to the present invention, wherein the slider pivotally folds against the forward or lower surface of the luggage for storage.

FIG. 3 is a right side elevation view of a third embodiment 300 of the luggage slider in combination with an article of wheeled luggage L3, with the slider or skid 302 comprising a flat plate that is hinged or pivoted to the article of luggage L3 adjacent the wheel axle A thereof. The lower surface 304 comprises a smooth, low coefficient of friction surface that faces outward or downward to contact an underlying surface when deployed as shown in solid lines in FIG. 3. The forward end articulates from the underside U3 of the luggage L3, generally as indicated by the arcuate arrow in FIG. 3. The opposite rearward end is pivotally or hingedly attached to the luggage L3 adjacent the axle A of the wheels W using a conventional hinge, pivot rod, etc. A latch mechanism may be employed to hold the pivoting slider or skid 302 in its deployed position as shown in solid lines, or in its retracted position as shown in broken lines. The mechanism may be actuated by an actuator pedal 310 disposed near the lower end or bottom B3 of the luggage L3.

Figure 4:
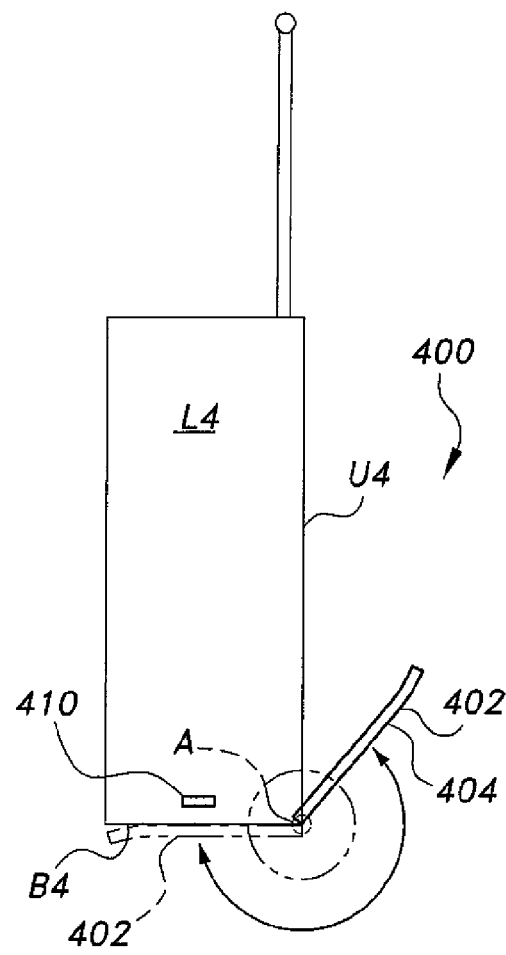
FIG. 4 is a diagrammatic right side elevation view of a fourth embodiment of a luggage slider according to the present invention, wherein the slider pivotally folds against the bottom or rear surface of the luggage for storage.

FIG. 4 illustrates a right side elevation view of a luggage slider embodiment 400 similar to the embodiment 300 of FIG. 3, in combination with an article of wheeled luggage L4. The slider or skid 402 of FIG. 4 is configured similarly to the slider or skid 302 of FIG. 3, having a low coefficient of friction lower surface 404 with a forward end 406 and an opposite rearward end 408 that is pivoted or hinged to the luggage L4 adjacent the axle A thereof. However, rather than folding against the underside U4 of the luggage L4, the hinge or pivot is disposed to the edge of the lower surface 404 of the slider or skid 402 such that the slider or skid 402 pivots in the opposite direction to fold against the bottom B4 of the wheeled luggage L4. A mechanism may be provided to deploy and fold the slider or skid 402, with the mechanism actuated by an actuator pedal 410 disposed near the lower end or bottom B4 of the luggage 14.

Figure 5:
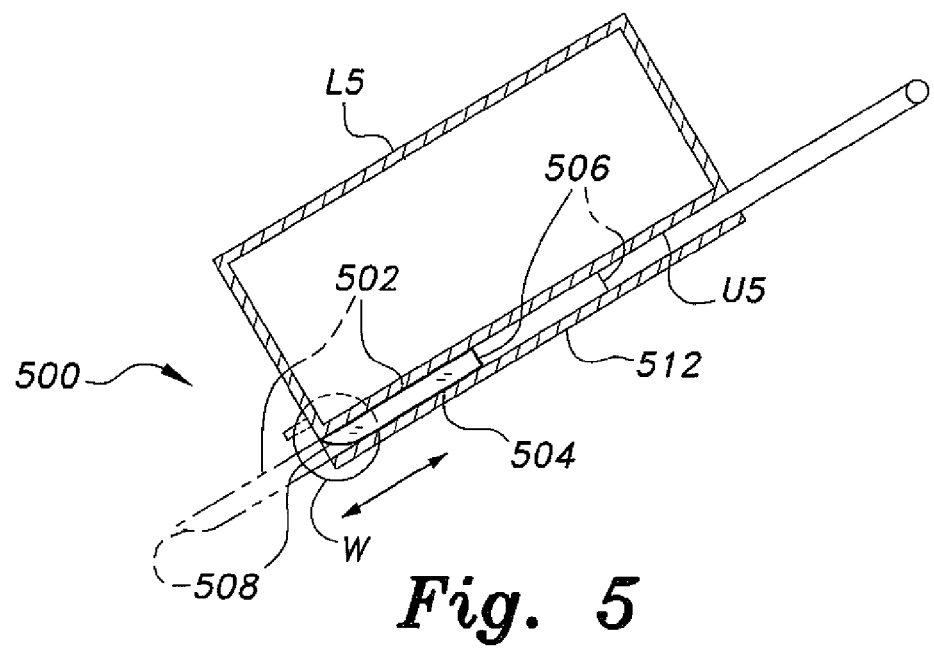
FIG. 5 is a diagrammatic right side elevation view in section of a fifth embodiment of a luggage slider according to the present invention, wherein the slider is extensibly retractable in a receptacle of the forward or lower surface of the luggage.

FIG. 5 provides a right side elevation view of a fifth embodiment 500 of the luggage slider in combination with an article of wheeled luggage L5, wherein the slider or skid 502 is selectively extendible and retractable from the luggage L5. The luggage L5 is shown in section, to illustrate the operation of the slider or skid 502. The skid or slider 502 has a similar configuration to those skid or slider embodiments described further above, i.e., a low friction lower surface 504, forward end 506, and opposite rearward end 508, with the wheels W of the luggage L5 protruding slightly below the lower surface 504 of the skid 502 even when the skid is deployed. The rearward end 508 may be smoothly rounded to facilitate passage over the underlying surface. Rather than being immovably affixed to the luggage L5, the skid 502 is selectively deployable from and retractable into a receptacle 512 permanently built into the underside U5 of the luggage L5. A mechanism may be provided to extend and retract the skid or slider 502, the mechanism being operated by an actuator pedal 510.

Figure 6:
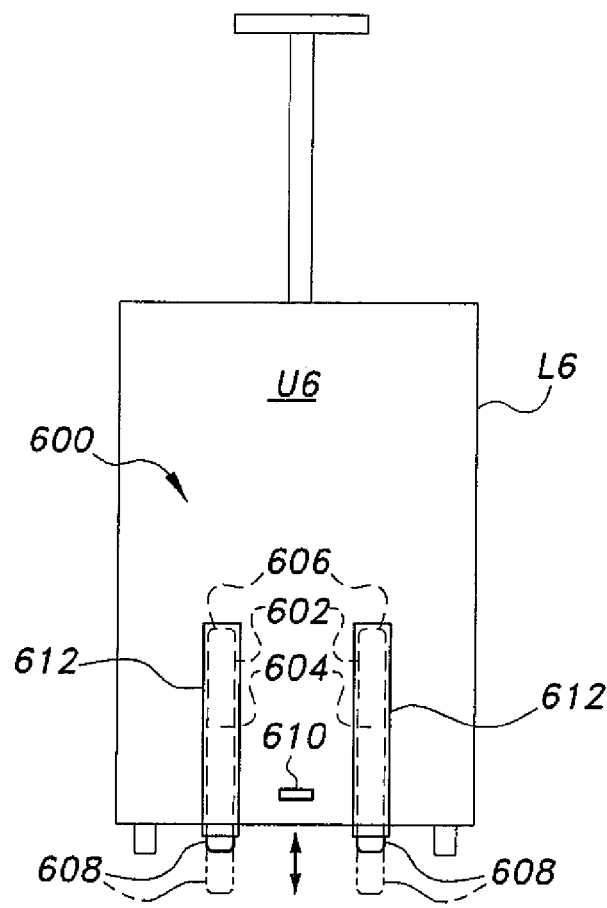
FIG. 6 is a diagrammatic front elevation view of a sixth embodiment of a luggage slider according to the present invention, wherein the luggage includes two relatively narrow and parallel extensibly retractable sliders.

FIG. 6 illustrates a front elevation view of another luggage slider and luggage combination embodiment, designated as slider or skid 602 and luggage L6. There are actually two laterally spaced skids 602 installed upon the underside U6 (shown as the facing side of the upright luggage L6, in FIG. 6) of the luggage L6. Each of the skids 602 includes a lower (forward facing, in FIG. 6) surface 604, a forward (or upper) end 606, and an opposite rearward (or lower) end 608. The two skids 602 selectively extend from and retract into a pair of corresponding receptacles 612 permanently built into the underside U6 of the luggage L6, much in the manner of the single flat plate skid 502 of FIG. 5. The two skids 602 are shown in their retracted state in solid lines in FIG. 6, with their lowermost extensions being slightly above the lowermost peripheries of the two wheels W. When the two skids 602 are extended, as shown in broken lines in FIG. 6, they extend slightly below or beyond the peripheries of the two wheels W to provide sliding surfaces for pulling the luggage L6 over an uneven surface or flight of stairs. Rather than being configured as flat plates, the two skids 602 may comprise rigid bars of metal or other suitable material. Extension and retraction is controlled by an actuator pedal 610 disposed near the bottom of the luggage L6.

Figure 7:
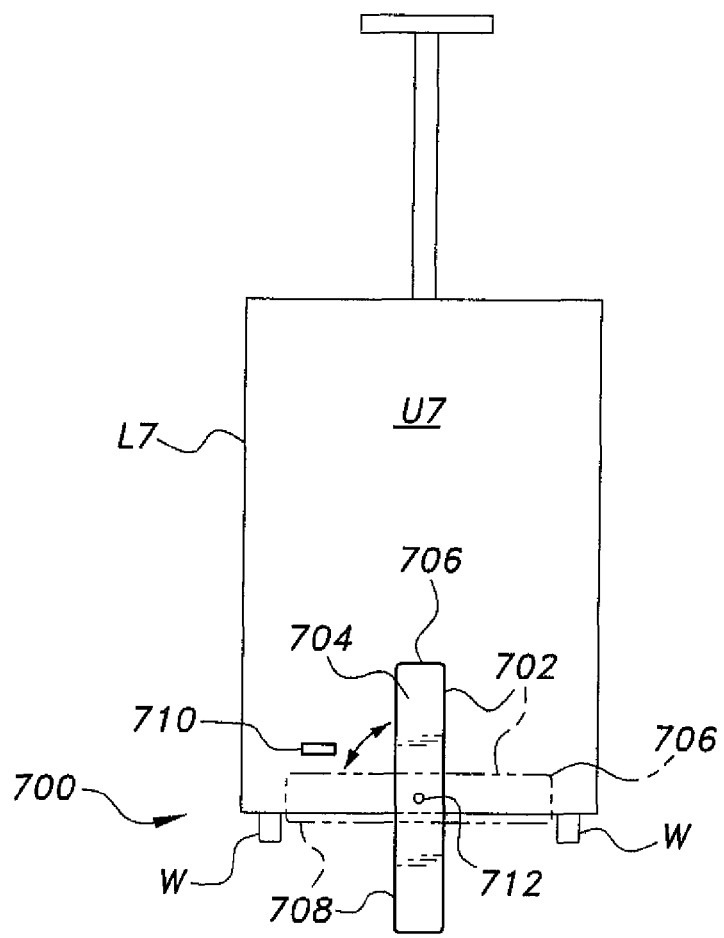
FIG. 7 is a diagrammatic front elevation view of a seventh embodiment of a luggage slider according to the present invention, wherein the slider is pivotally disposed upon the lower forward edge of the luggage.

FIG. 7 illustrates a front elevation view of an article of wheeled luggage L7 having another embodiment 700 of the luggage slider in combination therewith, designated as luggage slider or skid 702. The luggage skid 702 is attached externally near the lowermost edge of the underside U7 of the luggage L7 by a pivot 712. The luggage skid 702 includes a smooth lower surface 704 having a low coefficient of friction, with the skid 702 having a forward end 706 (to the right in the orientation of FIG. 7, when the skid is pivoted to its storage position as shown in broken lines) and an opposite rearward end 708 (to the left in FIG. 7, in broken lines). An actuator pedal 710 extends from some convenient location on the luggage L7, for the selective pivotal deployment of the skid 702 to its operational position, as shown in solid lines, or to its storage position between the wheels W, as shown in broken lines in FIG. 7.

Figure 8:
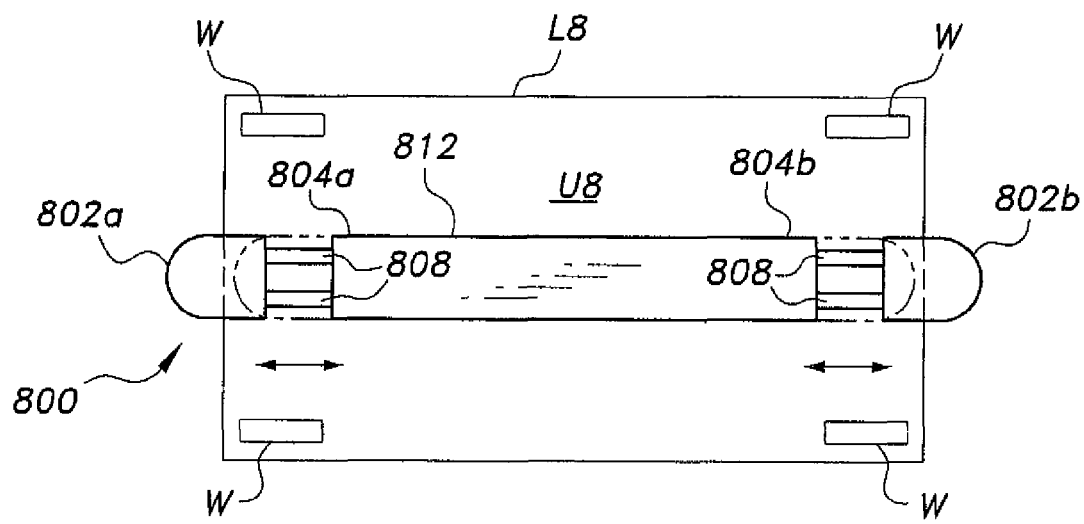
FIG. 8 is a diagrammatic bottom plan view of an eighth embodiment of a luggage slider according to the present invention, wherein the slider is disposed beneath a four wheeled cart or the like and has mutually opposed, extensibly retractable forward and rearward extensions.

FIG. 8 is a bottom plan view of the underside U8 of an article of luggage L8 with an eighth luggage slider embodiment 800 in combination therewith, wherein the luggage comprises cart having four wheels W. In this embodiment, a generally central receptacle 812 is provided along the underside U8 of the luggage L8 or cart, with the receptacle having mutually opposed first and second ends 804a and 804b. The ends 804a and 804b may be oriented to the front or to the rear of the direction of travel of the luggage or cart L8, depending upon its direction of travel. First and second skids 802a and 802b telescopically extend from the respective ends 804a and 804b of the receptacle 812, with their extensions shown in solid lines in FIG. 8. The skids 802a and 802b may comprise flat plates, but extend on arms 808 formed of rigid bars. Extension and retraction may be by means of a mechanism operated by an actuation pedal (not shown in FIG. 8), similar to other embodiments illustrated in previously described Figs.

Figure 9:
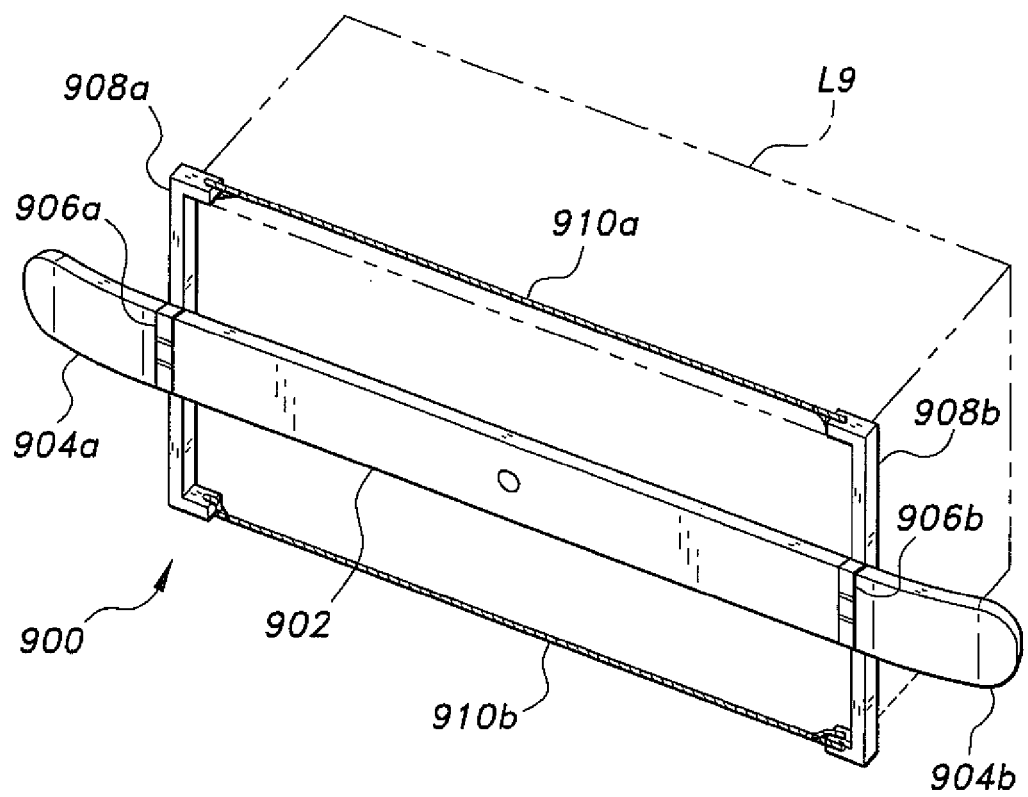
FIG. 9 is a bottom perspective view of a ninth embodiment of a luggage slider according to the present invention, wherein the slider is removably installable upon the bottom of a trunk or similar object.

FIG. 9 provides a perspective view of a ninth embodiment 900 having a skid 902 removably attached to the underside U9 of an article of luggage L9, e.g., a box, chest, carton, etc. The skid 902 is oriented much like the skid 802 of the embodiment 800 of FIG. 8, in that it has mutually opposed first and second ends 904a and 904b. The ends 904a and 904b may be oriented to the front or to the rear of the direction of travel of the luggage or cart L9, depending upon its direction of travel. While the skid 902 generally comprises a flat plate, the two ends 904a and 904b may be curved upward to reduce the chances of the ends catching upon some obstruction. First and second clamps, respectively 906a and 906b, secure the skid 902 to corresponding brackets 908a and 908b that attach removably to the corners of the underside U9 of the luggage L9. The brackets 908a and 908b are secured to the luggage L9 by means of first and second elastic cords 910a and 910b.

Figure 10:
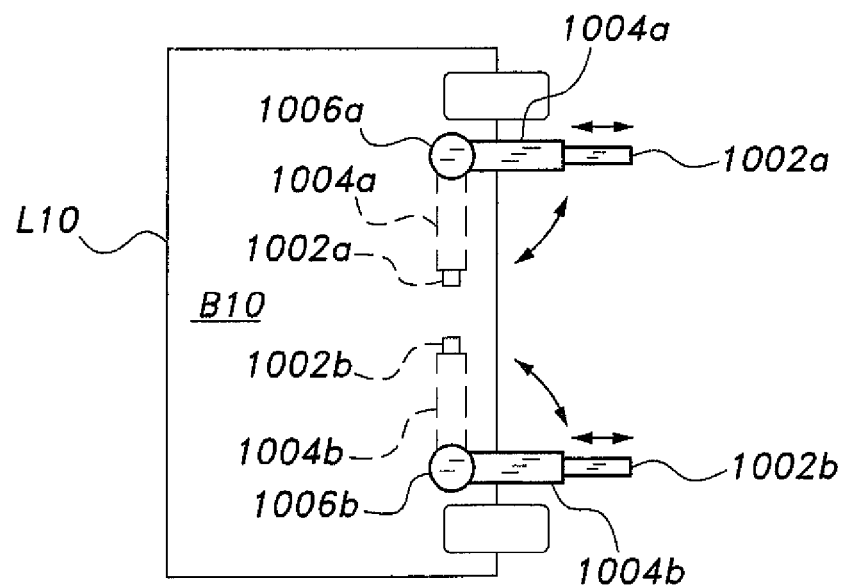
FIG. 10 is a bottom plan view of a tenth embodiment of a luggage slider according to the present invention, wherein two sliders are pivotally and telescopically disposed upon the bottom of the luggage.

FIG. 10 is an illustration of a tenth luggage slider embodiment 1000 in combination with an article of wheeled luggage L10. FIG. 10 provides a bottom plan view of the bottom B10 of an article of wheeled luggage L10 having wheels W, with first and second sliders or skids 1002a and 1002b mounted to the bottom B10 of the luggage L10. Each of the skids telescopically extends and retracts from respective sleeves 1004a and 1004b, with the two sleeves being pivotally attached to pivots 1006a and 1006b attached to the bottom B10 of the luggage L10. The deployed or extended positions of the skids 1002a and 1002b and their sleeves 1004a and 1004b are shown in solid lines in FIG. 10, with their stowed positions being shown in broken lines.

Figure 11:
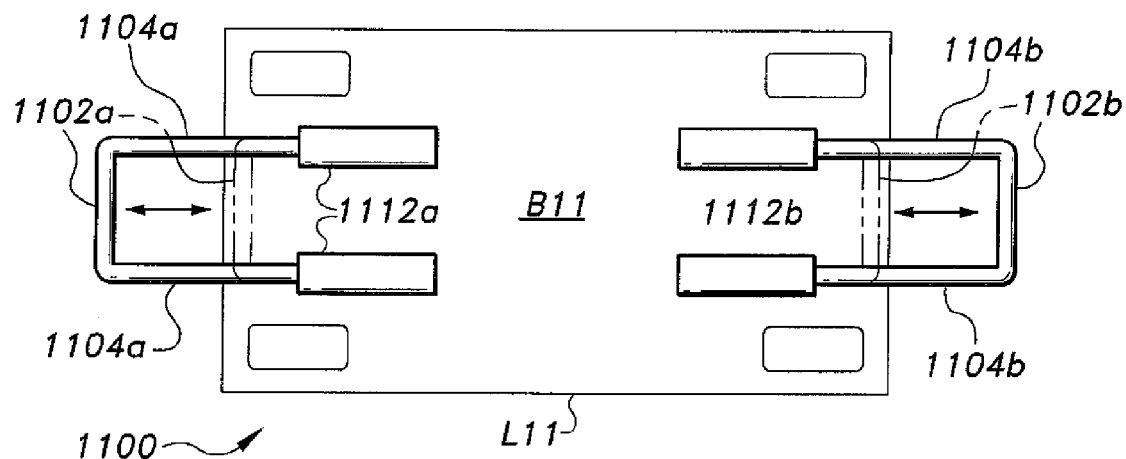

FIG. 11 is a bottom plan view of an eleventh embodiment 1100 of the luggage sliders, with the embodiment 1100 being in combination with a four wheeled article of luggage or cart L11. The luggage sliders or skids 1102a and 1102b extend from opposite ends of the bottom B11 of the luggage cart L11, respectively comprising squared-off, generally U-shaped rigid bars. The captured ends 1104a and 1104b of the skid bars 1102a and 1102b telescope in and out of respective sleeves or receptacles 1112a and 1112b that are permanently affixed to the bottom B11 of the luggage cart L11. The skid bars 1102a, 1102b are shown in their extended, operable positions in solid lines and in their stowed or retracted positions in broken lines in FIG. 11.

Figure 12:
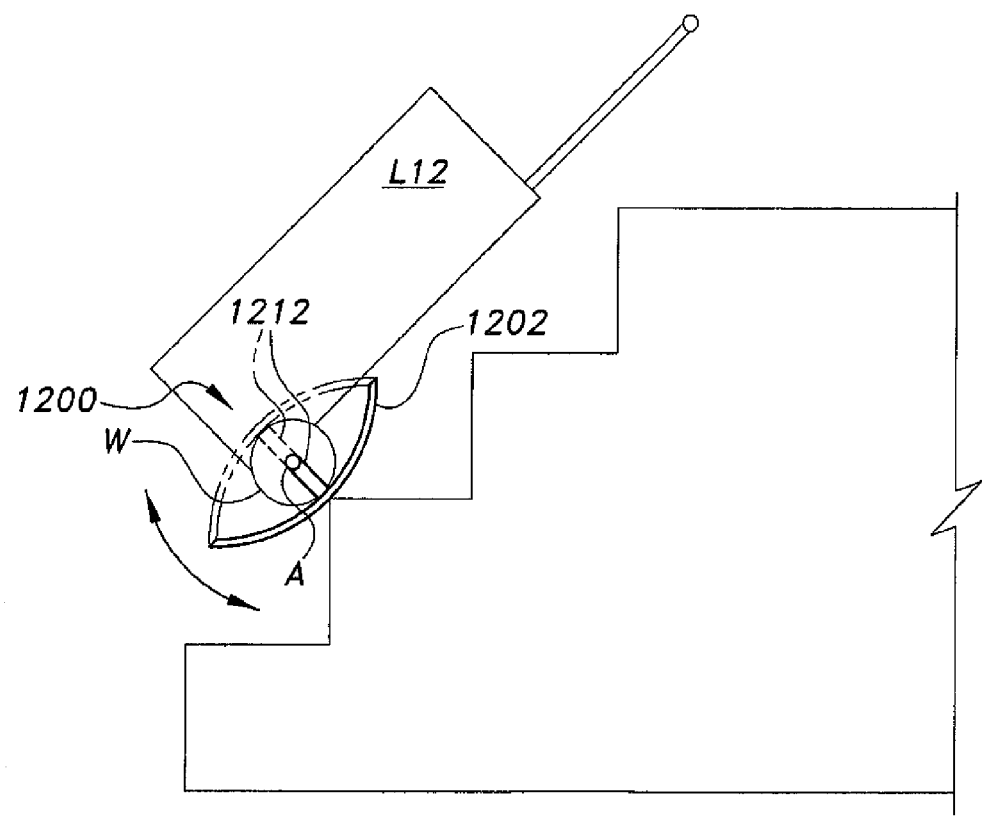
FIG. 12 is a diagrammatic environmental right side elevation view of a twelfth embodiment of a luggage slider according to the present invention, wherein a luggage slider is pivotally disposed about the axle of a wheeled suitcase or the like for deployment over each wheel.

FIG. 12 is a side elevation view of a twelfth embodiment 1200 of the luggage sliders, with an article of wheeled luggage L12 having a pair rotary mounted sliders or skids 1202 in combination therewith. While only a single skid 1202 is shown in the right side elevation view of FIG. 12, it will be seen that another identical skid 1202 will be installed on the opposite left side of the luggage L12, out of view in FIG. 12. The skid 1202 has an arcuate shape with turned-up ends, with its midpoint 1204 attached to a strut 1212 that is in turn pivotally attached to the axle A that supports the wheels W of the wheeled luggage L12. The wheel W is free to rotate independently of the skid 1202 and its strut 1212. Thus, the strut 1212 and its attached skid 1202 are free to pivot to a deployed position below the wheels W, as shown in solid lines in FIG. 12 to negotiate a flight of stairs or the like, or to a stowed position above the wheels W for conveyance of the luggage L12 on its wheels W on a relatively flat surface.

Figure 13:
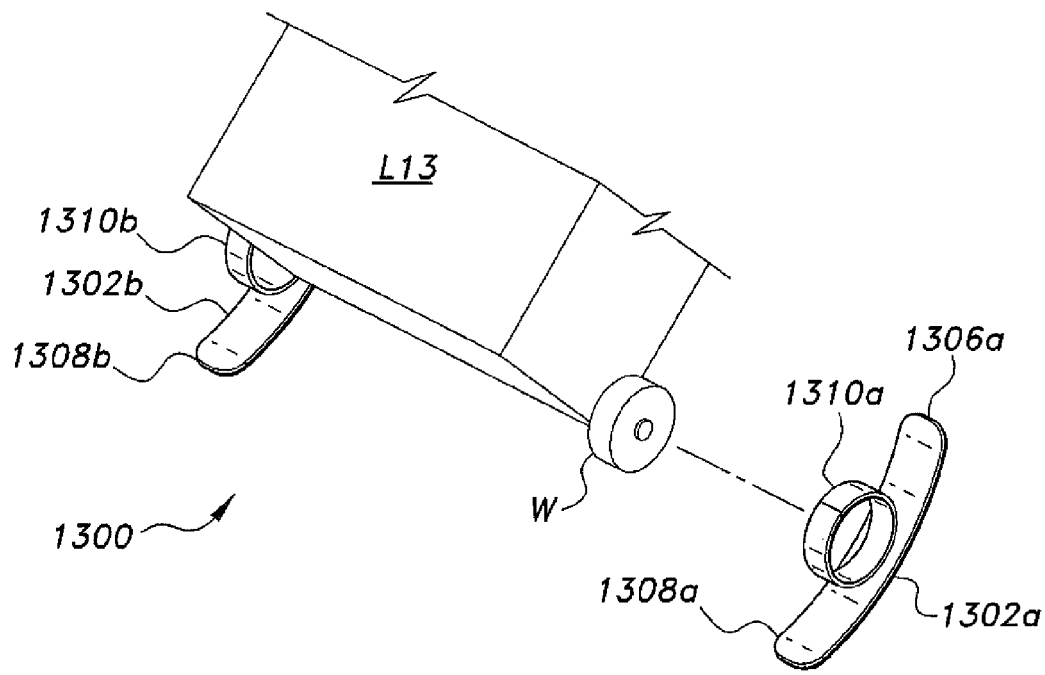

FIG. 13 is a perspective view of a thirteenth embodiment 1300 of the luggage sliders, illustrating a pair of skids 1302a and 1302b that removably attach to the wheels W of the luggage L13. Each of the skids 1302a, 1302b is curved, with an upturned forward end (the forward end 1306a of the first skid 1302a is visible in FIG. 13) and an opposite upturned rearward end 1308a, 1308b. A wheel attachment band, respectively 1310a and 1310b, extends upwardly from the center of each of the skids. The wheel attachment bands fit snugly about the respective wheels W and remain attached thereto for pulling the luggage L13 up a stepped inclined surface or other uneven surface. The wheel attachment bands may comprise elastic bands or may have some mechanical adjustment to allow them to selectively grip their respective wheels as desired and to provide for their removal when not needed.

Figure 14:
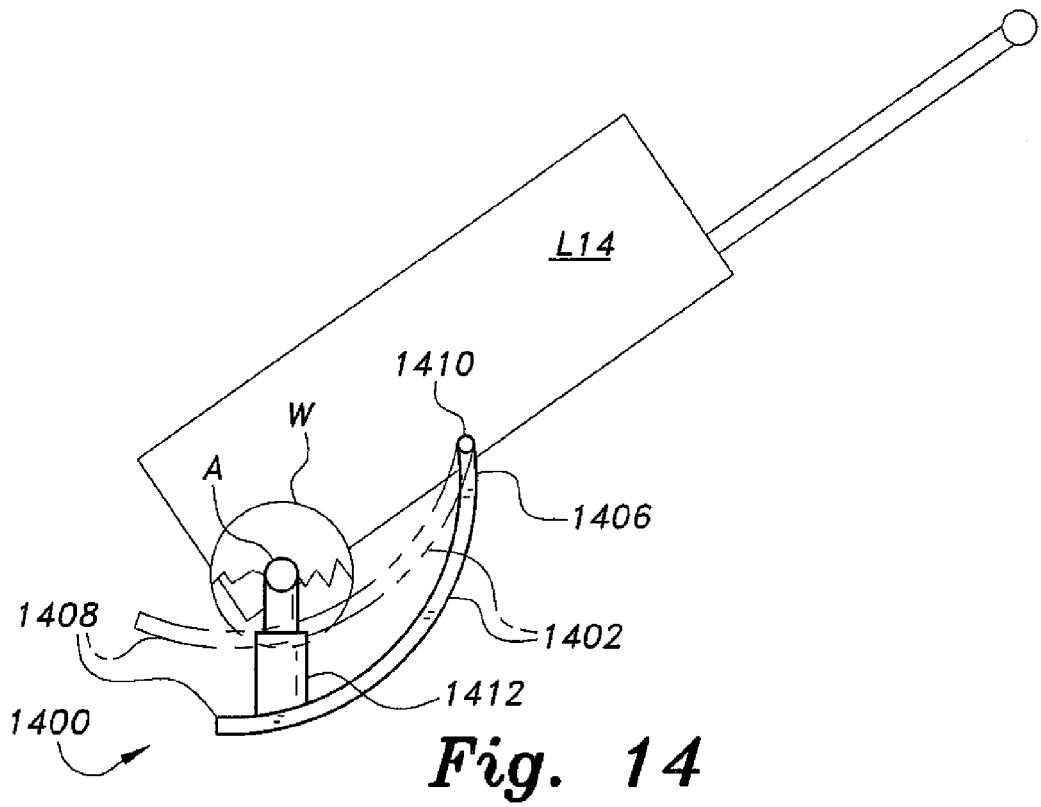
FIG. 14 is a diagrammatic right side elevation view of a fourteenth embodiment of a luggage slider according to the present invention, wherein a slider is pivotally attached to the bottom or forward surface of the wheeled luggage for selective extension below the plane of the wheels.

FIG. 14 is a right side elevation view illustrating a fourteenth embodiment 1400 of the luggage sliders, comprising an article of wheeled luggage L14 having a pair rotary mounted sliders or skids 1402 in combination therewith. While only a single skid 1402 is shown in the right side elevation view of FIG. 14, it will be seen that another identical skid 1402 will be installed on the opposite left side of the luggage L14, out of view in FIG. 14. The skid 1402 has an arcuate shape with a first or forward end 1404 attached to the luggage L14 by a pivot 1410 and an opposite rearward end 1406. A telescoping extension and retraction strut 1412 is disposed between the rearward end 1406 (or rearward end portion) of the skid 1402, and the axle A that supports the wheels W of the wheeled luggage L14. When the strut 1412 is extended, it lowers the rearward portion 1408 of the skid 1402 below the lower periphery of the wheel W (shown in broken lines), thus lifting the wheel W clear of the underlying surface to allow the skid 1402 to bear against the underlying surface. When the strut 1412 is retracted, the rearward portion 1408 of the skid 1402 is raised above the lower periphery of the wheel W, allowing the luggage L14 to be rolled upon its wheels for conveyance.

It is to be understood that the present invention is not limited to the embodiments described above, but encompasses any and all embodiments within the scope of the following claims.

We claim:

1. A luggage slider for an article of luggage, the article of luggage having a bottom surface, the bottom surface having a pair of longitudinally extending side edges and a pair of laterally extending side edges whereby four corners are formed by the intersecting pairs of side edges, the luggage slider comprising:
   a single, rigid, elongate skid adapted for installation beneath the article of luggage such that the single, rigid, elongate skid extends parallel to the longitudinally extending side edges of the bottom surface, the single, rigid, elongate skid having a lower surface adapted for sliding on a support surface, wherein the single, rigid, elongate skid is adapted for removable installation to the article of luggage;
   a pair of elastic straps, wherein each strap is adapted to be coextensive with a respective longitudinally extending side edge;
   a pair of brackets, each of the brackets being sized to be coextensive with a respective laterally extending side edge for respective releasable attachment to the pair of laterally extending side edges of the bottom surface, each of the brackets being connected to the elastic straps for releasably securing the pair of brackets to the bottom surface; and
   a pair of clamps for respectively securing the single, rigid, elongate skid to the pair of brackets.

2. In combination, an article of luggage and a luggage slider, comprising:
   the article of luggage having a bottom surface, the bottom surface having a pair of longitudinally extending side edges and a pair of laterally extending side edges whereby four corners are formed by the intersecting pairs of side edges;
   the luggage slider consisting of:
      a single elongate skid adapted for installation beneath the article of luggage such that the rigid, elongate skid extends parallel to the longitudinally extending side edges of the bottom surface, the elongate skid having a lower surface adapted for sliding on a support surface, wherein the elongate skid is adapted for removable installation to the article of luggage;
      a pair of elastic straps, wherein each strap is adapted to be coextensive with a respective longitudinally extending side edge;
      a pair of brackets, each of the brackets being sized to be coextensive with a respective laterally extending side edge for respective releasable attachment to the pair of laterally extending side edges of the bottom surface, each of the brackets being connected to the elastic straps for releasably securing the pair of brackets to the bottom surface; and
      a pair of clamps for respectively securing the elongate skid to the pair of brackets.

* * * * *